(12) United States Patent
Choi et al.

(10) Patent No.: US 12,506,235 B2
(45) Date of Patent: Dec. 23, 2025

(54) BATTERY MODULE

(71) Applicant: LG ENERGY SOLUTION, LTD., Seoul (KR)

(72) Inventors: Bum Choi, Daejeon (KR); Jong Yoon Keum, Daejeon (KR); Dong Hwan Shin, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 607 days.

(21) Appl. No.: 17/914,104

(22) PCT Filed: Apr. 22, 2021

(86) PCT No.: PCT/KR2021/005068
§ 371 (c)(1),
(2) Date: Sep. 23, 2022

(87) PCT Pub. No.: WO2021/256693
PCT Pub. Date: Dec. 23, 2021

(65) Prior Publication Data
US 2024/0213638 A1    Jun. 27, 2024

(30) Foreign Application Priority Data
Jun. 15, 2020 (KR) ........................ 10-2020-0072368

(51) Int. Cl.
*H01M 50/627* (2021.01)
*H01M 10/6556* (2014.01)
(Continued)

(52) U.S. Cl.
CPC ..... *H01M 50/627* (2021.01); *H01M 10/6556* (2015.04); *H01M 50/213* (2021.01);
(Continued)

(58) Field of Classification Search
CPC .......... H01M 50/627; H01M 10/6556; H01M 50/213; H01M 50/264; H01M 50/547;
(Continued)

(56) References Cited

U.S. PATENT DOCUMENTS 3,741,428 A * 6/1973 Evjen .................. H01M 50/242
248/300
2011/0045335 A1    2/2011 Lee et al.
(Continued)

FOREIGN PATENT DOCUMENTS

CN    109923730 A    6/2019
JP    2001-060466 A    3/2001
(Continued)

OTHER PUBLICATIONS

International Search Report (with partial translation) and Written Opinion dated Aug. 6, 2021, issued in corresponding International Patent Application No. PCT/KR2021/005068.
(Continued)

*Primary Examiner* — Lisa S Park
(74) *Attorney, Agent, or Firm* — Morgan, Lewis & Bockius LLP

(57) ABSTRACT

A battery module includes a plurality of battery cells and a module case configured to receive the plurality of battery cells to improve spatial utilization of the battery module. The module case includes a case body at front, rear, left and right surfaces, and a lower part thereof; a case cover at an upper part of the case body; and a mounting bracket at a side surface of the case body to be fastened to an external device or a neighboring battery module, and wherein holes are formed in a middle part of the case cover such that a coolant port, configured to allow a coolant to be introduced and discharged therethrough, and a power terminal, configured (Continued)

to allow electrical connection with an outside therethrough, are connected to external equipment.

10 Claims, 4 Drawing Sheets

(51) Int. Cl.
*H01M 50/213* (2021.01)
*H01M 50/249* (2021.01)
*H01M 50/264* (2021.01)
*H01M 50/547* (2021.01)

(52) U.S. Cl.
CPC ....... *H01M 50/264* (2021.01); *H01M 50/547* (2021.01); *H01M 50/249* (2021.01); *H01M 2220/20* (2013.01)

(58) Field of Classification Search
CPC ........... H01M 50/249; H01M 2220/20; H01M 10/613; H01M 10/6567; H01M 10/625; H01M 10/643; H01M 10/6551; H01M 50/20; Y02E 60/10; B60Y 2200/91
See application file for complete search history.

(56) References Cited

U.S. PATENT DOCUMENTS

| | | |
|---|---|---|
| 2013/0207459 A1 | 8/2013 | Schröder et al. |
| 2014/0212722 A1 | 7/2014 | Lee et al. |
| 2014/0212723 A1 | 7/2014 | Lee et al. |
| 2014/0212724 A1 | 7/2014 | Lee et al. |
| 2016/0133890 A1 | 5/2016 | Lee et al. |
| 2018/0205045 A1 | 7/2018 | Schröder et al. |
| 2018/0331334 A1 | 11/2018 | Lee et al. |
| 2019/0140235 A1 | 5/2019 | Lindstrom et al. |
| 2019/0229385 A1* | 7/2019 | Lee .......................... B60L 50/64 |
| 2020/0350610 A1* | 11/2020 | Yoo ..................... H01M 50/207 |

FOREIGN PATENT DOCUMENTS

| | | | |
|---|---|---|---|
| JP | 2011-150976 | * | 8/2011 |
| JP | 2014-534563 A | | 12/2014 |
| JP | 2015-210894 A | | 11/2015 |
| JP | 2019-535108 A | | 12/2019 |
| KR | 10-2006-0102020 A | | 9/2006 |
| KR | 10-2010-0109873 A | | 10/2010 |
| KR | 10-2014-0109982 A | | 9/2014 |
| KR | 10-1709562 B1 | | 3/2017 |
| KR | 10-2019-0022485 A | | 3/2019 |
| WO | WO2019/093671 | * | 5/2019 |

OTHER PUBLICATIONS

Office Action issued in corresponding Taiwanese Patent Application No. 110121236, dated Oct. 1, 2024.

* cited by examiner

[FIG. 1]
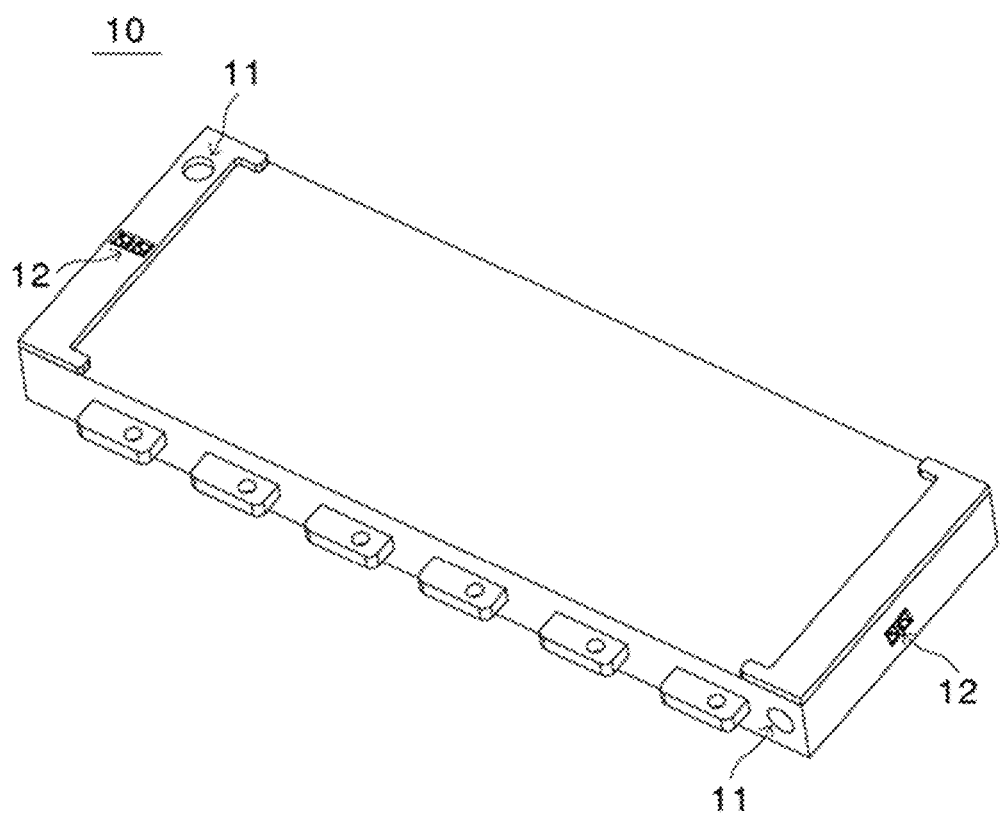

[FIG. 2]
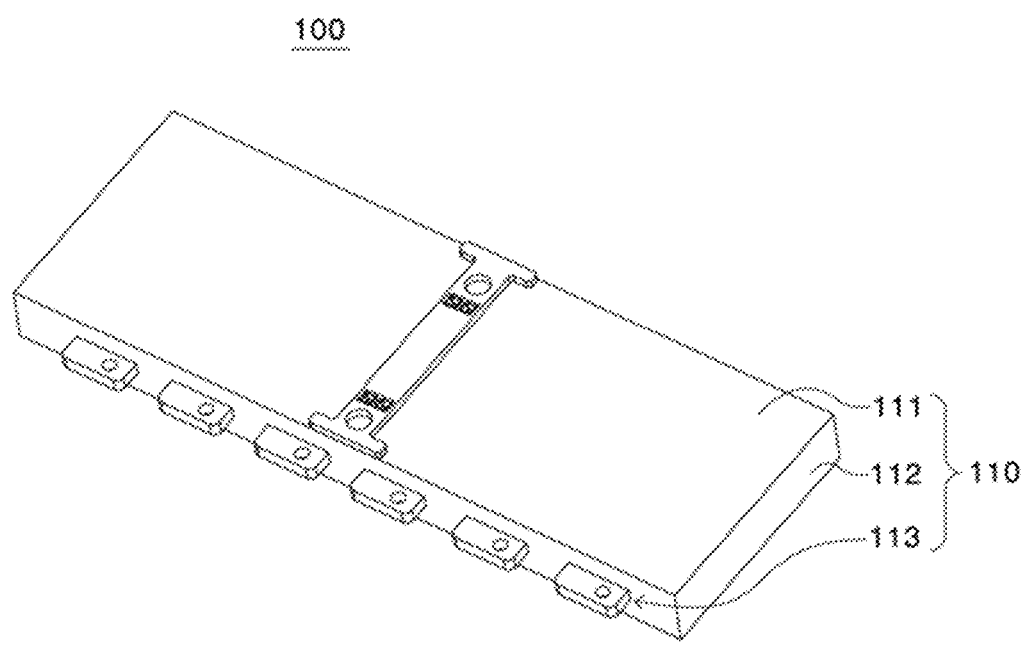

[FIG. 3]
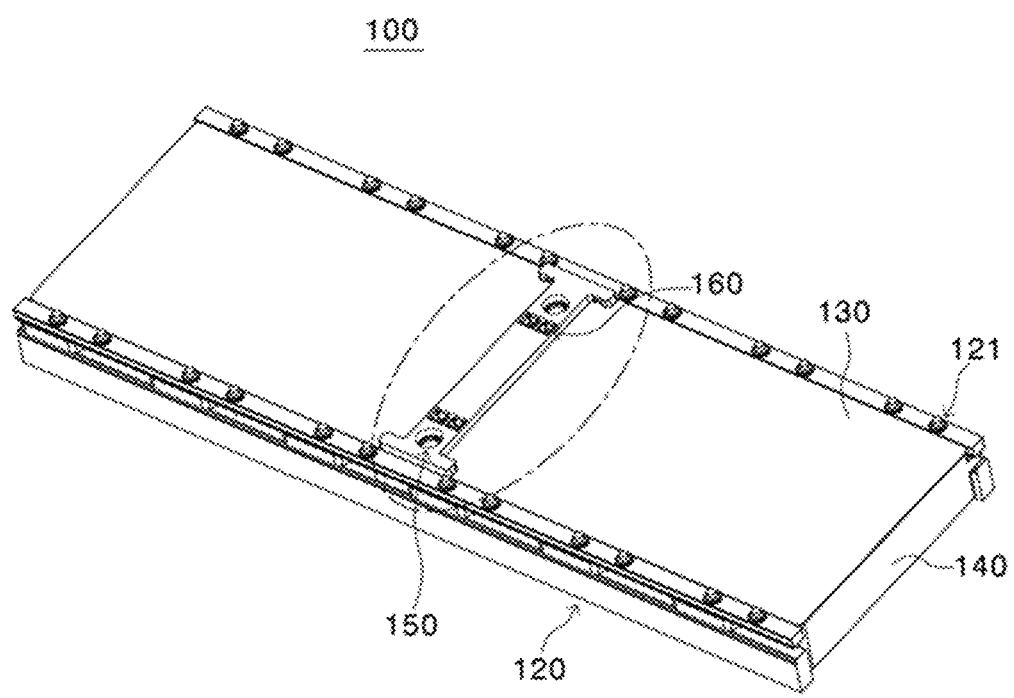

[FIG. 4]
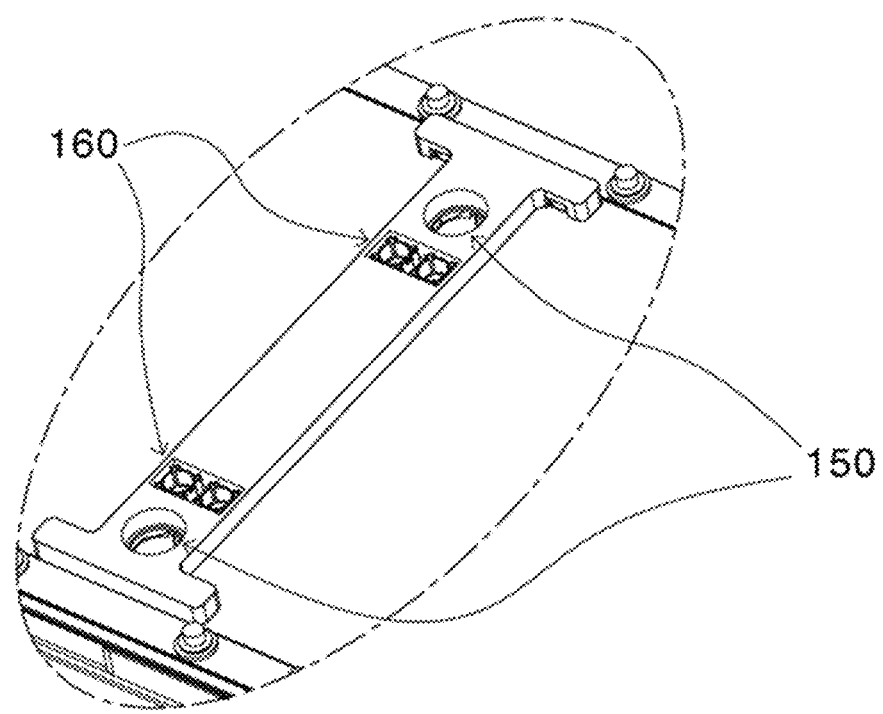

BATTERY MODULE

This application claims the benefit of priority to Korean Patent Application No. 10-2020-0072368 filed on Jun. 15, 2020, the disclosure of which is incorporated by reference in its entirety.

TECHNICAL FIELD

This application claims the benefit of priority to Korean Patent Application No. 2020-0072368 filed on Jun. 15, 2020, the disclosure of which is incorporated by reference in its entirety.

The present invention relates to a battery module having a power terminal and a coolant port disposed at a middle part thereof.

BACKGROUND ART

With technological development of mobile devices, such as smartphones, laptop computers, and digital cameras, and an increase in demand therefor, research on secondary batteries, which are capable of being charged and discharged, has been actively conducted. In addition, secondary batteries, which are energy sources substituting for fossil fuels causing air pollution, have been applied to an electric vehicle (EV), a hybrid electric vehicle (HEV), a plug-in hybrid electric vehicle (P-HEV), and an energy storage system (ESS).

There are a lithium ion battery, a lithium polymer battery, a nickel-cadmium battery, a nickel-hydride battery, and a nickel-zinc battery as secondary batteries that are widely used at present. The operating voltage of such a unit secondary battery cell, i.e. a unit battery cell, is about 2.0V to 5.0V. In the case in which output voltage higher than the above operating voltage is required, therefore, a plurality of battery cells may be connected to each other in series to constitute a cell module assembly. In addition, cell module assemblies may be connected to each other in series or in parallel to constitute a battery module depending on required output voltage or charge and discharge capacities. In general, a battery pack is manufactured using at least one battery module by adding an additional component.

Meanwhile, a battery module is manufactured using a method of disposing a plurality of battery cells with high density. In general, the battery module is provided with a power terminal for electrical connection with the outside and a heat sink configured to dissipate heat of the battery module during charging and generated discharging processes. In addition, the battery module is provided with a coolant port configured to supply a coolant to the heat sink.

For such a battery module, particularly a battery module applied to an electric vehicle, one of important problems is to increase energy density of the battery module in order to increase the range of the electric vehicle.

FIG. 1 is a perspective view schematically showing a conventional battery module including power terminals and coolant ports.

When describing the conventional battery module 10 with reference to FIG. 1, conventionally, the coolant ports 11 and the power terminals 12 are located at opposite ends of the battery module, thus occupying predetermined spaces, whereby spatial utilization of the battery module is deteriorated. As a result, energy density of the battery module is reduced.

Also, when external impact is applied to the battery module, leakage due to damage to the coolant ports and poor contact to the power terminals may occur.

DISCLOSURE

Technical Problem

The present invention has been made in view of the above problems, and it is an object of the present invention to provide a battery module having a power terminal and a coolant port disposed at a middle part thereof.

Technical Solution

In order to accomplish the above object, a battery module according to the present invention includes a plurality of battery cells and a module case configured to receive the plurality of battery cells, wherein the module case includes a case body located at four side surfaces, i.e. front, rear, left and right surfaces, and a lower part thereof, a case cover located at an upper part of the case body, and a mounting bracket located at a side surface of the case body so as to be fastened to an external device or a neighboring battery module, and wherein holes are formed in a middle part of the case cover such that a coolant port, configured to allow a coolant to be introduced and discharged therethrough, and a power terminal, configured to allow electrical connection with the outside therethrough, are connected to external equipment.

In addition, the battery module according to the present invention may further include a heat sink configured to cool the plurality of battery cells in the module case.

In addition, the battery module according to the present invention may further include an inner frame configured to receive the plurality of battery cells in the module case, wherein the heat sink may be fastened to the inner frame.

In addition, the battery module according to the present invention may further include an inner cover located at an upper part of the inner frame in the module case, wherein the inner cover may be provided in a middle part thereof with holes configured to allow the power terminal and the coolant port to be connected to the external equipment therethrough.

Also, in the battery module according to the present invention, the heat sink may have a flow channel, in which the coolant flows, defined therein, and the flow channel may be connected to the coolant port such that the coolant is introduced and discharged.

Also, in the battery module according to the present invention, the inner frame may further include a fastening portion configured to allow the heat sink to be fastened to the inner frame therethrough.

Also, in the battery module according to the present invention, each of the plurality of battery cells may be a cylindrical battery cell.

Also, in the battery module according to the present invention, the coolant port may include a coolant inlet and a coolant outlet formed so as to be spaced apart from each other by a predetermined distance.

In addition, a device according to the present invention includes the battery module according to the present invention.

In addition, the device according to the present invention may be an electric vehicle (EV).

Advantageous Effects

A battery module according to the present invention has an advantage in that a power terminal and a coolant port are disposed at a middle part of the battery module, whereby it is possible to improve spatial utilization of the battery module, and therefore it is possible to increase energy density of the battery module.

In addition, the battery module according to the present invention has an advantage in that, since the power terminal and the coolant port are disposed at the middle part of the battery module, it is possible to prevent damage to the power terminal and the coolant port when external impact is applied to the battery module.

DESCRIPTION OF DRAWINGS

FIG. 1 is a perspective view schematically showing a conventional battery module including power terminals and coolant ports.

FIG. 2 is a perspective view of a battery module according to an embodiment of the present invention.

FIG. 3 is a perspective view of the battery module according to the embodiment of the present invention, from which a module case is removed.

FIG. 4 is an enlarged view showing a middle part of the battery module according to the embodiment of the present invention at which power terminals and coolant ports are located.

BEST MODE

In the present application, it should be understood that the terms "comprises," "has," "includes," etc. specify the presence of stated features, numbers, steps, operations, elements, components, or combinations thereof, but do not preclude the presence or addition of one or more other features, numbers, steps, operations, elements, components, or combinations thereof.

In addition, the same reference numbers will be used throughout the drawings to refer to parts that perform similar functions or operations. In the case in which one part is said to be connected to another part in the specification, not only may the one part be directly connected to the other part, but also, the one part may be indirectly connected to the other part via a further part. In addition, that a certain element is included does not mean that other elements are excluded, but means that such elements may be further included unless mentioned otherwise.

Hereinafter, a battery module according to the present invention will be described with reference to the accompanying drawings.

FIG. 2 is a perspective view of a battery module according to an embodiment of the present invention.

When describing the battery module 100 according to the present invention with reference to FIG. 2, the battery module 100 is configured such that a plurality of battery cells is received in a module case 110. The module case 110 includes a case body 112 located at four side surfaces and a lower part of the battery module 100, a case cover 111 located at an upper part of the case body 112 so as to cover the upper part of the case body, and a mounting bracket 113 located at a side surface of the case body 112 so as to be fastened to an external device or a neighboring battery module.

In addition, holes are formed in a middle part of the case cover 111 such that power terminals, configured to allow electrical connection with the outside therethrough, and coolant ports, configured to allow a coolant to be introduced and discharged therethrough, can be connected to external equipment.

Meanwhile, plates constituting the four side surfaces and the lower part of the case body 112 may be integrally formed or may be separately formed and coupled to each other by welding or mechanical fastening.

Various well-known types of battery cells may be used as the battery cells provided in the battery module 100 according to the present invention. Thereamong, cylindrical battery cells are preferably used.

Meanwhile, FIG. 3 is a perspective view of the battery module according to the embodiment of the present invention, from which the module case is removed, and FIG. 4 is an enlarged view showing a middle part of the battery module according to the embodiment of the present invention at which power terminals and coolant ports are located.

When describing the battery module 100 according to the present invention in detail with reference to FIGS. 3 and 4, the battery module 100 includes an inner frame 120, an inner cover 130, a heat sink 140, coolant ports 150, and power terminals 160, which are provided in the module case 110.

First, the inner frame 120 is located at side surfaces or side surfaces and lower surfaces of the plurality of battery cells received therein so as to protect and fix the battery cells therein. In addition, the inner frame 120 is provided with a fastening portion 121, via which the inner frame is fastened to the heat sink 140 so as to fix the heat sink 140.

Any of various well-known methods that are generally applied to a battery module manufacturing process, such as fastening using a bolt and a nut and welding, may be used as a fastening method using the fastening portion 121.

Meanwhile, the inner cover 130 is located at the upper part of the inner frame 120 so as to be coupled to the inner frame 120, and holes corresponding to the coolant ports 150 and the power terminals 160 are formed in a middle part of the inner cover as positions thereof corresponding to the holes formed in the middle part of the case cover 111 of the module case 110.

In addition, the heat sink 140 is made of a conductivity, and material that exhibits high thermal has a coolant flow channel, in which a coolant configured to cool the battery cells flows, defined therein, whereby it is possible to effectively cool the battery cells.

As an example, the heat sink 140 may be configured to have the shape of a box configured to wrap all of the side surfaces, the upper surfaces, and the lower surfaces of the battery cells, or may be located at only some of the side surfaces, the upper surfaces, and the lower surfaces of the battery cells. However, the present invention is not limited thereto. The heat sink may be configured to have various structures capable of effectively cooling the battery cells provided in the battery module 100.

That is, the heat sink 140 may not only cool the battery cells but also receive the battery cells together with the inner frame 120 depending on the shape thereof.

The coolant ports 150, which are connected to the flow channel of the heat sink 140, include a coolant inlet and a coolant outlet, whereby the coolant ports serve to supply a coolant to the heat sink 140 and to discharge the coolant that has absorbed heat of the battery cells through the heat sink 140 out of the heat sink 140.

It is preferable for the coolant inlet and the coolant outlet constituting the coolant ports 150 to be disposed so as to be spaced apart from each other by a predetermined distance in consideration of interference between components.

Finally, the power terminals 160, which are provided for electrical connection between the battery module 100 and an external device or a neighboring battery module, are disposed at the middle part of the battery module 100 so as to be spaced apart from the coolant ports 150 by a predetermined distance.

The coolant ports 150 and the power terminals 160, which are conventionally disposed at opposite ends of the battery module 100 in a separated state, are disposed in the middle part of the battery module 100, whereby it is possible to improve spatial utilization.

That is, a larger number of battery cells are received in a battery module of the same size, whereby it is possible to increase energy density of the battery module.

In addition, since the coolant ports 150 and the power terminals 160, which have lower mechanical stiffness than the module case 110, are disposed at the middle part of the battery module 100, it is possible to prevent defects of the battery module due to damage to the coolant ports 150 and the power terminals 160 when external impact is applied to the battery module.

The battery module according to the present invention may be applied to various devices, such as an electric vehicle (EV), a plug-in hybrid electric vehicle (P-HEV), and an energy storage system (ESS), so as to be used as a power supply source.

Although the specific details of the present invention have been described in detail, those skilled in the art will appreciate that the detailed description thereof discloses only preferred embodiments of the present invention and thus does not limit the scope of the present invention. Accordingly, those skilled in the art will appreciate that various changes and modifications are possible, without departing from the category and the technical idea of the present invention, and it will be obvious that such changes and modifications fall within the scope of the appended claims.

DESCRIPTION OF REFERENCE NUMERALS 10, 100: Battery modules
110: Module case
111: Case cover
112: Case body
113: Mounting bracket
120: Inner frame
121: Fastening portion
130: Inner cover
140: Heat sink
11, 150: Coolant ports
12, 160: Power terminals

The invention claimed is:

1. A battery module comprising a plurality of battery cells and a module case configured to receive the plurality of battery cells, wherein the module case comprises:
a case body at front, rear, left and right surfaces, and a lower part thereof;
a case cover at an upper part of the case body; and
a mounting bracket at a side surface of the case body to be fastened to an external device or a neighboring battery module,
wherein holes are formed in a middle part of the case cover such that a coolant port, configured to allow a coolant to be introduced and discharged therethrough, and a power terminal, configured to allow electrical connection with an outside therethrough, are configured to be connected to external equipment,
wherein the battery module further comprises:
an inner frame configured to receive the plurality of battery cells in the module case; and
an inner cover located at an upper part of the inner frame in the module case, and
wherein the inner cover is provided in a middle part of the inner frame with holes configured to allow the power terminal and the coolant port to be connected to the external equipment therethrough.

2. A battery module comprising a plurality of battery cells and a module case configured to receive the plurality of battery cells, wherein the module case comprises:
a case body at front, rear, left and right surfaces, and a lower part thereof;
a case cover at an upper part of the case body; and
a mounting bracket at a side surface of the case body to be fastened to an external device or a neighboring battery module,
wherein holes are formed in a middle part of the case cover such that a coolant port, configured to allow a coolant to be introduced and discharged therethrough, and a power terminal, configured to allow electrical connection with an outside therethrough, are configured to be connected to external equipment,
wherein the battery module further comprises:
a heat sink configured to cool the plurality of battery cells in the module case; and
an inner frame configured to receive the plurality of battery cells in the module case,
wherein the heat sink is fastened to the inner frame using a fastening portion, and
wherein the fastening portion includes at least a bolt and a nut.

3. The battery module according to claim 2, wherein the heat sink has a flow channel, in which the coolant flows, defined therein, and the flow channel is connected to the coolant port such that the coolant is introduced and discharged.

4. The battery module according to claim 2, wherein the inner frame comprises the fastening portion configured to allow the heat sink to be fastened to the inner frame therethrough.

5. The battery module according to claim 1, wherein each of the plurality of battery cells is a cylindrical battery cell.

6. The battery module according to claim 1, wherein the coolant port comprises a coolant inlet and a coolant outlet formed to be spaced apart from each other by a predetermined distance.

7. A device comprising the battery module according to claim 1.

8. The device according to claim 7, wherein the device is an electric vehicle (EV).

9. The battery module according to claim 1, wherein the holes provided in the middle part of the inner frame correspond to the holes formed in the middle part of the case cover.

10. A battery module comprising a plurality of battery cells and a module case configured to receive the plurality of battery cells, wherein the module case comprises:
a case body at front, rear, left and right surfaces, and a lower part thereof;
a case cover at an upper part of the case body;
a mounting bracket at a side surface of the case body to be fastened to an external device or a neighboring battery module;
a bar disposed in a middle part of the case cover, and
wherein holes are formed in the bar such that a coolant port, configured to allow a coolant to be introduced and discharged therethrough, and a power terminal, configured to allow electrical connection with an outside therethrough, are configured to be connected to external equipment.

* * * * *